United States Patent

Saruhashi et al.

[11] Patent Number: 6,001,288
[45] Date of Patent: Dec. 14, 1999

[54] PROCESS FOR PRODUCING A HOLLOW FIBER MEMBRANE HAVING A HYDROPHOBIC COATING

[75] Inventors: Makoto Saruhashi; Masatomi Sasaki, both of Kanagawa, Japan

[73] Assignee: Terumo Kabushiki Kaisha, Tokyo, Japan

[21] Appl. No.: 08/997,825

[22] Filed: Dec. 24, 1997

[30] Foreign Application Priority Data

Dec. 25, 1996 [JP] Japan .................................... 8-344379

[51] Int. Cl.$^6$ ............................................... B29C 65/00
[52] U.S. Cl. ................... 264/41; 264/209.1; 264/558; 264/559; 264/561; 264/562; 264/563; 427/2.3
[58] Field of Search ........................ 264/176.1, 177.14, 264/177.15, 178 R, 48, 49, 209.1, 558, 561, 562, 41, 559, 563; 210/500.23, 321.71; 427/2.3

[56] References Cited

U.S. PATENT DOCUMENTS

| | | | |
|---|---|---|---|
| 3,615,024 | 10/1971 | Michaels | 210/490 |
| 4,454,085 | 6/1984 | Schindler et al. | 264/41 |
| 4,588,407 | 5/1986 | Isono et al. | 623/11 |
| 4,634,447 | 1/1987 | Isono et al. | 623/66 |
| 4,643,715 | 2/1987 | Isono et al. | 604/4 |
| 4,872,982 | 10/1989 | Taylor | 210/490 |
| 5,160,672 | 11/1992 | Sasaki et al. | 264/41 |
| 5,489,303 | 2/1996 | Sasaki et al. | 623/11 |
| 5,762,798 | 6/1998 | Wenthold et al. | 210/500.23 |

FOREIGN PATENT DOCUMENTS

| | | |
|---|---|---|
| 0 749 775 A1 | 12/1996 | European Pat. Off. . |
| 57-071408 | 5/1982 | Japan . |
| 57-71409 | 5/1982 | Japan . |
| 57-71410 | 5/1982 | Japan . |
| 57-71411 | 5/1982 | Japan . |
| 57-199808 | 12/1982 | Japan . |
| 7-178166 | 7/1995 | Japan . |

OTHER PUBLICATIONS

Cabasso et al. "Polysulfone Hollow Fibers. I. Spinning and Properties". Journal of Applied Polymer Science, vol. 20, pp. 2377–2394, 1979.

Cabasso et al. "Polysulfone Hollow FIbers. II. Morphology". Journal of Applied Polymer Science. vol. 21, pp. 165–180, 1977.

*Primary Examiner*—W. L. Walker
*Assistant Examiner*—Richard W. Ward
*Attorney, Agent, or Firm*—Burns, Doane, Swecker & Mathis, LLP

[57] ABSTRACT

A process for producing a hollow fiber membrane, a hollow fiber membrane, and a dialyzer of hollow fiber membrane type is provided. The hollow fiber membrane is highly biocompatible, and the production process is quite simple and inexpensive. In the process of the invention, the hollow fiber membrane is produced in a system wherein a polymer-containing spinning solution is extruded from a tube-in-tube type orifice of a spinner in a coagulation solution to form the hollow fiber membrane. The polymer-containing spinning solution is extruded from the outer tube of the orifice to form a cylindrical filament having an inner bore and a core solution is ejected from the inner tube of the orifice into the inner bore of the filament for coagulation of the filament. The filament is directly extruded into the coagulation solution or extruded into air and then drawn to the coagulation solution. The core solution is supplemented with a hydrophobic modifier such as vitamin E and a surfactant and the resulting hollow fiber membrane contains the hydrophobic modifier on its inner surface.

9 Claims, 3 Drawing Sheets

PROCESS FOR PRODUCING A HOLLOW FIBER MEMBRANE HAVING A HYDROPHOBIC COATING

BACKGROUND OF THE INVENTION

This invention relates to a process for producing a hollow fiber membrane and a dialyzer of hollow fiber membrane type. More specifically, this invention relates to a process for producing a hollow fiber membrane and a dialyzer of hollow fiber membrane type wherein the hollow fiber membrane is highly biocompatible and presents activation of blood components such as leukocytes and blood platelets.

Blood treating devices of the hollow fiber membrane type have been widely used in extracorporeal blood circulation, haemodialysis, blood oxygenation during open heart surgery, plasma separation, and the like for quite some time. Recently, polymeric hollow fiber membranes were widely employed particularly for the purpose of dialysis, gas exchange, blood component separation and the like.

The polymeric hollow fiber membranes, however, are not free from drawbacks. For example, for the case of patients who have been undergoing heamodialysis by frequently experiencing extracorporeal blood circulation using the above-mentioned blood treating devices complications believed to be caused through activation of the leukocytes and/or platelets have been noted, and such complications have become a serious issue for those undergoing the heamodialysis.

In addition, an increasing number of patients who have undergone heamodialysis for a long period have exhibited a decrease in blood antioxidative properties and a high level of lipid peroxide as well as symptoms of arteriosclerotic diseases which are estimated to have been caused by such conditions.

In order to obviate such problems, JP-B-62-41738 suggests use of an artificial organ wherein a vitamin E is coated on the surface of a dialysis membrane for utilizing various physiological actions of the vitamin E including in vivo antioxidative properties, stabilization of biological membranes, inhibition of platelet coagulation, and the like. Fish oils such as eicosapentaenoic acid are also known to inhibit platelet coagulation.

Such prior art artificial organs, however, had been prepared by a quite complicated and costly process since the vitamin E had to be coated onto the membrane after the production of the dialysis membrane or after the assemblage of the artificial organ. In the method wherein an alcoholic solution of the vitamin E is coated onto a membrane having any micropore after the membrane production, vitamin E pregnates into the micropores of the porous hollow fiber membrane. This process, however, suffers from the defect that a large amount of vitamin E is required for the vitamin E coating.

When a hydrophobic modifier such as a fat-soluble vitamin (e.g. vitamin E) or a fish oil is used by adding such hydrophobic modifier in the core solution comprising water and an organic solvent, water content can not be increased in excess of a certain level since the fat soluble hydrophobic modifier is unsoluble or hardly soluble in water and increased water content in the core solution results in the separation of the hydrophobic modifier from the core solution.

If the vitamin E is incorporated in the hollow fiber membrane in the course of its production by adding the vitamin E in the core solution comprising water and an organic solvent, the fat-soluble vitamin E is hardly soluble in water, and increases the water content which results in the separation of the vitamin E. The separation of the vitamin E from the core solution has to be avoided by limiting the water content to a low level. Such limitation of the water content in the core solution adversely affects uniformity of the coating amount in the inner surface of the membrane or the coagulation of the extruded spinning solution. It is therefore quite difficult to spin a hollow fiber membrane with good membrane structure. For example, in the case of producing a polysulfone hollow fiber membrane in a tube-in-tube type spinner by using a spinning solution containing polysulfone as its main polymer and a core solution, the resulting hollow fiber membrane will suffer from improper membrane structure when the core solution has a water content of less than 20% by weight since the the spinning solution extruded from the outer tube would not be sufficiently coagulated by the core solution ejected from the inner tube.

SUMMARY OF THE INVENTION

In view of such situation, an object of the present invention is to obviate the problems as described above involved with the prior art.

Another object of the present invention is to provide a simple, low cost process for producing a hollow fiber membrane; a hollow fiber membrane produced by such process; and a dialyzer assembled by using such hollow fiber membrane.

A further object of the present invention is to provide a process for producing a hollow fiber membrane which is highly blood-compatible inducing minimized blood damage and which has an appropriate sieve coefficient; a hollow fiber membrane produced by such process; and a dialyzer assembled by using such hollow fiber membrane.

Such objects of the invention are attained by the hollow fiber membrane production process, the hollow fiber membrane, and the dialyzer of hollow fiber membrane type as described below.

According to the first aspect of the present invention, there is provided a process for producing a hollow fiber membrane wherein a polymer-containing spinning solution is extruded from a tube-in-tube type orifice of a spinner in a coagulation liquid (a liquid capable for coagulation of the spinning solution) to form the hollow fiber membrane.

In this aspect of the present invention, the polymer-containing spinning solution is extruded from the outer tube of the orifice to form a cylindrical filament having an inner bore while ejecting a core solution for coagulation of the spinning solution from the inner tube of the orifice into the inner bore of the filament. Further the filament is directly extruded into the coagulation solution or extruded into air and then drawn to the coagulation solution, and the core solution is supplemented with a hydrophobic modifier and a surfactant. The resulting hollow fiber membrane contains the hydrophobic modifier on its inner surface.

In such process, the hydrophobic modifier may comprise 0.001 to 10% by weight of said core solution.

The hydrophobic modifier may comprise a fat-soluble vitamin, and the fat-soluble vitamin may comprise a vitamin E. The vitamin E may be at least one member selected from the group consisting of α-tocopherol, α-tocopherol acetate, and α-tocopherol nicotinate.

The surfactant may comprise a water-soluble, high molecular weight compound.

The high molecular weight compound may comprise 0.0001 to 20% by weight of the core solution.

The polymer in the spinning solution has a solubility parameter $\delta$ of up to 13 $(cal/cm^3)^{1/2}$.

There is also provided a hollow fiber membrane produced by the hollow fiber membrane production process as described above.

There is also provided in the present invention a porous hollow fiber membrane containing a hydrophobic modifier produced by spinning a spinning solution containing a polymer having a solubility parameter $\delta$ of up to 13 $(cal/cm^3)^{1/2}$, wherein said hollow fiber membrane has sieving coefficients measured with dextrans of up to 0.4 at a molecular weight of 100,000 and at least 0.5 at a molecular weight of 10,000.

In the hollow fiber membrane, the hydrophobic modifier may comprise a vitamin E.

In the hollow fiber membrane of the present invention, the hydrophobic modifier is present mainly on the inner surface and not on the outer surface when the distribution of the hydrophobic modifier is compared. The presence of the hydrophobic modifier "mainly on the inner surface and not on the outer surface" means that the hydrophobic modifier is not detected on the outer surface by infrared spectroscopy, X ray photoelectron spectroscopy, secondary ion mass spectroscopy, and the like, or even if detected, the amount detected is far smaller than the amount on the inner surface.

Such hollow fiber membrane may also be the one produced by the hollow fiber membrane production process as described above.

There is also provided in the present invention a dialyzer of hollow fiber membrane type wherein the hollow fiber membrane is any one of the above-described hollow fiber membranes.

BRIEF DESCRIPTION OF THE DRAWINGS

FIG. 3 shows sieving coefficient of the hollow fiber membranes in relation to molecular weight of the dextran.

DETAILED DESCRIPTION OF THE INVENTION

Figure 1:
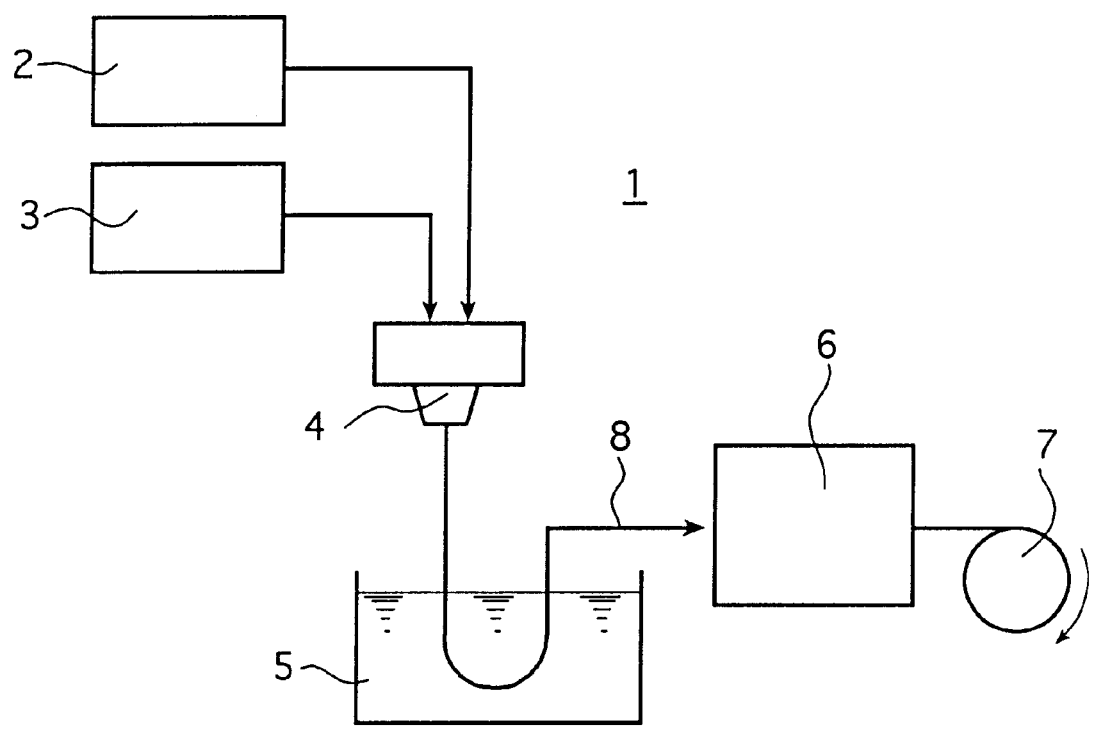
FIG. 1 is a schematic diagram illustrating an embodiment of the hollow fiber membrane production process according to the present invention.

A porous hollow fiber membrane adapted for use in an artificial kidney should be capable of removing low molecular weight uremia substances while retaining useful substances such as albumin. Such porous hollow fiber membranes are produced only by a delicate process wherein the pore diameter is accurately controlled. The pore diameter of the hollow fiber membrane generally depends the composition of the spinning solution, composition of the core solution, draft ratio, liquid composition for coagulation, temperature, humidity and the like. Among these, the composition of the core solution is one of the most important factors since the combination and the mixing ratio of the solvent and the nonsolvent in relation to the membrane-constituting polymer determine the coagulation rate, and hence, the morphology of the interior surface of the hollow fiber membrane.

Various processes are known in the art for the production of hollow fiber membranes, including the processes wherein a tube-in-tube type orifice is used and the spinning solution is extruded from the outer tube (i.e. from the annular space defined between the inner and outer tubes) and the core solution is ejected from the inner tube. The hollow fiber membrane may be prepared in such process by extruding the spinning solution into air, allowing the filament to fall down by gravity, passing the filament through a coagulant bath for coagulation, and washing and drying the filament (dry-wet spinning); by using a bath comprising an upper layer of a non-coagulating solution and a lower layer of a coagulating solution, and extruding the spinning solution directly into the non-coagulating solution and passing the filament through the coagulating solution (JP-A-57-71409); by using a bath comprising an upper layer of a coagulating solution and a lower layer of a non-coagulating solution, and extruding the spinning solution directly into the non-coagulating solution and passing the filament through the coagulating solution (JP-A-57-199808); extruding the spinning solution directly into a non-coagulating solution and passing the filament along the boundary between the coagulating solution and the non-coagulating solution (JP-A-57-71408, JP-A-57-71410); or by extruding the spinning solution from the orifice surrounding a non-coagulating solution and passing the filament through a coagulating solution (JP-A-71411).

In such processes, pore diameter of the hollow fiber membrane is controlled by adjusting the rate and the extent of the coagulation of the extruded spinning solution through the use of a coagulation solution which promotes the coagulation of the spinning solution (a non solvent for the spinning solution) and a non-coagulation solution which inhibits the coagulation of the spinning solution (a solvent for the spinning solution) either separately or in a mixture.

The spinning solution comprises a polymer, a solvent for the polymer, and optional additives. The polymer may comprise a mixture of the main polymer which constitutes the hollow fiber membrane as its main component and an additional polymer which serves a pore-forming agent while constituting the hollow fiber membrane.

In the process for producing the hollow fiber membrane of the present invention, a polymer-containing spinning solution is extruded from a tube-in-tube type orifice of the spinner in a coagulation solution to form the hollow fiber membrane. The polymer-containing spinning solution is extruded from the outer tube (i.e. annular space defined between the inner and outer tubes) to form a cylindrical filament having an inner bore and the core solution for coagulation of the spinning solution is extruded from the inner tube of the orifice into the inner bore of the filament. In this process, the filament may be directly extruded into the coagulation solution, or extruded into air and then drawn to the coagulation solution. The core solution is supplemented with a hydrophobic modifier and a surfactant and the resulting hollow fiber membrane contains the hydrophobic modifier on its inner surface.

The main polymer component of the polymer used in the spinning solution of the invention may have a solubility parameter $\delta$ of up to 13 $(cal/cm^3)^{1/2}$, and preferably 6 to 13 $(cal/cm^3)^{1/2}$. The term solubility parameter $\delta$ used herein designates an index described in "Polymer Data Handbook, basic edition", Society of Polymers Corporation, Baifukan K. K., Jan. 30, 1986, 591–593. A higher solubility parameter corresponds to higher hydrophilicity, and a lower solubility parameter corresponds to higher hydrophobicity, and use of the main polymer having the solubility parameter within the above-identified range enables the hydrophobic modifier of the predetermined amount to be incorporated into the interior surface of the hollow fiber membrane from the core solution.

The additional polymer functions as a pore forming agent or a thickener of the spinning solution, and only a slight amount of the additional polymer will be left after the washing of the coagulated membrane. The additional polymer typically comprises a hydrophilic polymer.

The main polymer and the additional polymer may comprise 5 to 25% by weight and 3 to 20% by weight of the spinning solution, respectively.

In the hollow fiber membrane production method of the present invention, miscibility between the main polymer and the hydrophobic modifier (e.g. a fat-soluble vitamin) is a crucial point. Use of the main polymer with a solubility parameter $\delta$ of up to 13 $(cal/cm^3)^{1/2}$ results in a good miscibility between the polymer and the hydrophobic modifier, in particular, the fat-soluble vitamin, and the hydrophobic modifier in the core solution is transferred, introduced, and immobilized onto the inner surface of the hollow fiber membrane. Typical such polymers include polyethylene ($\delta$=7.70), polymethyl methacrylate ($\delta$=9.10), polystyrene ($\delta$=9.15), polypropylene ($\delta$=9.40), polysulfone ($\delta$=9.90), polyhydroxyethyl methacrylate ($\delta$=10.00), nylon 66 ($\delta$=11.18), cellulose diacetate ($\delta$=11.35), polyacrylonitrile ($\delta$=12.35), polyvinyl alcohol ($\delta$=12.60), cellulose triacetate, ethylene-vinyl alcohol copolymer, polycarbonate, and the like, which may be used alone or in combinations of two or more.

The additional polymer used in combination with the main polymer may typically comprise polyvinylpyroridone (PVP), polyethylene glycol (PEG), and polypropylene glycol (PPG) which simultaneously functions as a thickener as will be described below.

A polymer having a solubility parameter $\delta$ of up to 13 $(cal/cm^3)^{1/2}$ is hydrophobic in nature, and water is generally used for the core solution since it is a nonsolvent for the main polymer of the spinning solution. On the other hand, a solvent or a solvent mixture which is soluble in water and which does not coagulate the polymer is used for the solvent in preparing the spinning solution.

Typical solvents used for the spinning solution include dimethylacetoamide (DMA), dimethylsulfoxide (DMSO), dimethylformamide (DMF) and the like, and a suitable solvent is selected depending on the type of the polymer used. The spinning solution may optionally contain additives such as a thickener and a hydrophilizer. Typical thickeners include polyvinylpyroridone (PVP), polyethylene glycol (PEG), and polypropylene glycol (PPG), and typical hydrophilizers include glycerin.

The core solution used for the coagulation of the spinning solution may comprise a nonsolvent or a mixture of a nonsolvent and a solvent for the synthetic polymer of the spinning solution, and a hydrophobic modifier in combination with a surfactant is added to such nonsolvent or the mixture of the nonsolvent and the solvent. Such nonsolvent for the polymer is water, and it would be the typical nonsolvent in consideration of its high coagulating capability for the synthetic polymer, low cost, safety, ease of discharge fluid, and the like. Exemplary solvents for the polymer are the solvents described above for the spinning solution, from which the one suitable is selected depending on the type of the polymer.

The content of the nonsolvent, namely water in the core solution is also critical for efficient production. When the water content is less than 20%, the core solution will not be able to coagulate the polymer to a sufficient degree, resulting in reduced spinnability. In addition, such core solution is incapable of controlling the diameter and the morphology of the pore. On the other hand, the vitamin E, the typical hydrophobic modifier, is a fat soluble substance, and even if the core solution comprises a mixture of water and a solvent for the vitamin E, excessively high water content results in markedly low solubility of the vitamin E, resulting in separation of the vitamin E from the mixed solvent.

Accordingly, the core solution of the present invention has a water content in excess of 20%, and preferably 25 to 55% so that the core solution will have adequate coagulation properties. The core solution of the present invention also contains the hydrophobic modifier and the surfactant, and therefore, the hydrophobic modifier is uniformly distributed throughout the core solution.

As mentioned above, in the production process of the present invention, the core solution of the present invention also contains a hydrophobic modifier such as vitamin E and a surfactant. Exemplary such hydrophobic modifiers include fat-soluble vitamins, fatty acids, fish oil, and hydrophobic polymers, and use of a fat-soluble vitamin is preferred in view of its biological origin and various physiological activities. Exemplary fat-soluble vitamins are vitamin A, vitamin D, vitamin E, vitamin K and ubiquinone, among which vitamin E being the most preferred in view of its high thermal stability and adaptability for industrial-scale production. Exemplary vitamin E include $\alpha$-tocopherol, $\alpha$-tocopherol acetate, and $\alpha$-tocopherol nicotinate, $\beta$-tocopherol, $\gamma$-tocopherol, and $\delta$-tocopherol.

The content in the core solution of the fat-soluble vitamin used for the hydrophobic modifier is preferably in the range of 0.001 to 10% by weight, and more preferably in the range of 0.01 to 5% by weight. Addition of the fat-soluble vitamin at a content of less than 0.01% by weight is insufficient to achieve any apparent effect, and addition at a content in excess of 10% by weight is uneconomical since no further addition effect is achieved.

Exemplary surfactants include water-soluble high molecular weight compounds, fatty acid salts such as sodium dodecylsulfate, and glycerin derivatives, among which the water-soluble high molecular weight compound being the most preferred in view of their biological safety and low residue.

Exemplary water-soluble high molecular weight compounds include polymers such as polyvinyl alcohol, polyethylene glycol, polypropylene glycol and polyvinyl pyrolidone and copolymers of such polymers. The type and the molecular weight of the water-soluble high molecular weight compound may be adequately selected in accordance with the composition of the core solution and the type of the hydrophobic modifier selected. The water-soluble high molecular weight compound, however, may have a molecular weight of at least 2,000, since the polymer with the molecular weight lower than 2,000 is insufficient in surfactant properties.

The content of the water-soluble high molecular weight compound may be adequately selected in accordance with the composition of the core solution, the type and the content of the hydrophobic modifier selected, and the type and the molecular weight of the water-soluble high molecular weight compound or water soluble polymer. The water-soluble high molecular weight compound, however, may be used at a content of 1/10 to 2 times the content of the hydrophobic modifier, namely, at a content of 0.0001 to 20% by weight, and preferably 0.001 to 10% by weight of the core solution. Content of the water-soluble high molecular weight compound of less than 0.0001% by weight is insufficient for uniform dispersion of the hydrophobic modifier, and the content in excess of 20% by weight will require complicated step for the removal of the excess water-soluble high molecular weight compound after the membrane solidification.

In the washing step after the coagulation of the filament, the organic solvent component in the core solution is replaced with water, and the vitamin E can no longer retain its distribution state. At this instance, the vitamin E in the core solution of a substantial amount deposits on the hydrophobic portion in the vicinity of its site, namely, on the inner surface of the membrane of the coagulated polymer. The presence of the hydrophobic modifier on the inner surface of the hollow fiber membrane can be detected by infrared spectroscopy, X ray electron spectroscopy, secondary ion mass spectroscopy and the like.

The hollow fiber membrane of the present invention is preferably produced by dry-wet spinning. The process for producing the hollow fiber membrane of the present invention is hereinafter described for such dry-wet spinning by referring to the drawings.

FIG. 1 is a schematic diagram illustrating an embodiment of the hollow fiber membrane production process according to the present invention.

Figure 2:
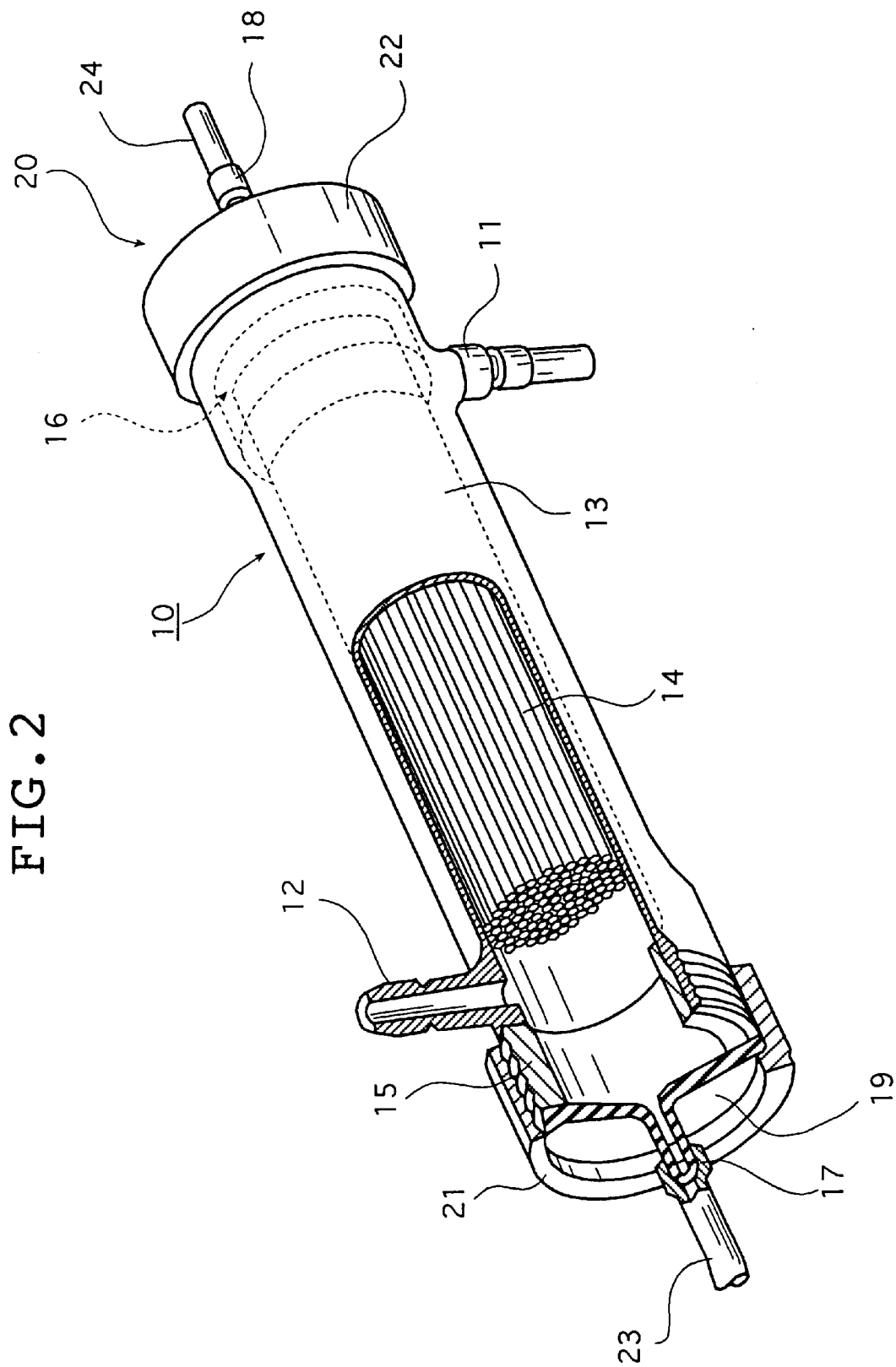
FIG. 2 is a partially cut away perspective view showing an embodiment of the dialyzer of hollow fiber membrane type according to the present invention.

FIG. 2 is a partially cut away perspective view showing an embodiment of the dialyzer of hollow fiber membrane type according to the present invention.

Figure 3A:
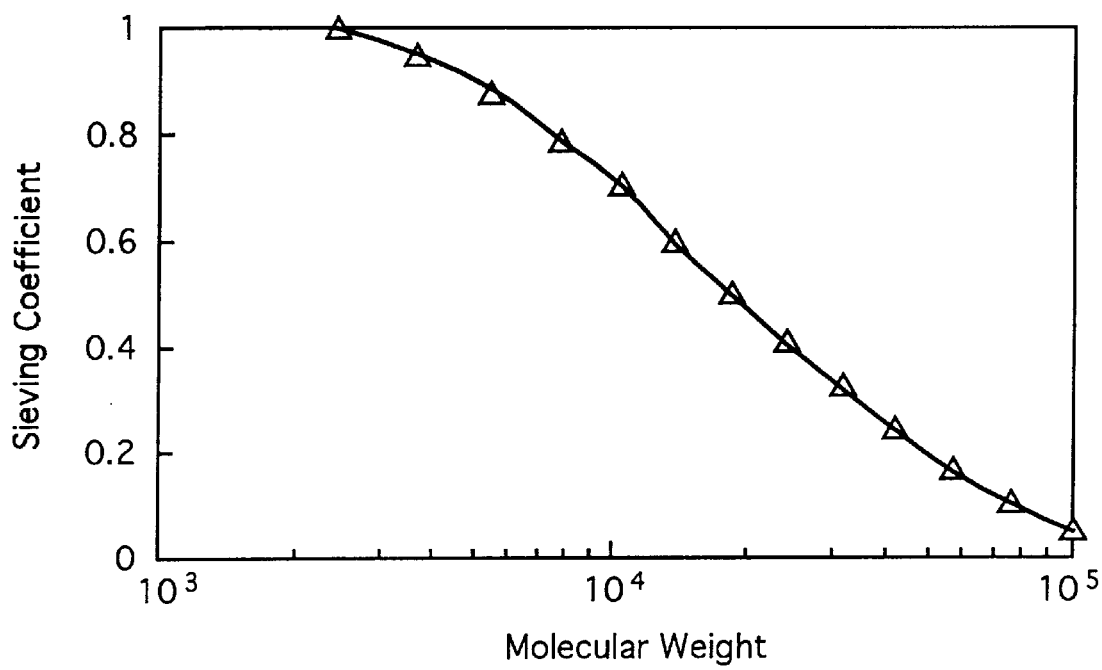
FIG. 3(a) is a graph showing the measurements for the hollow fiber membrane prepared in Example 10.

FIG. 3(a) shows measurements for the hollow fiber membrane prepared in Example 10.

Figure 3B:
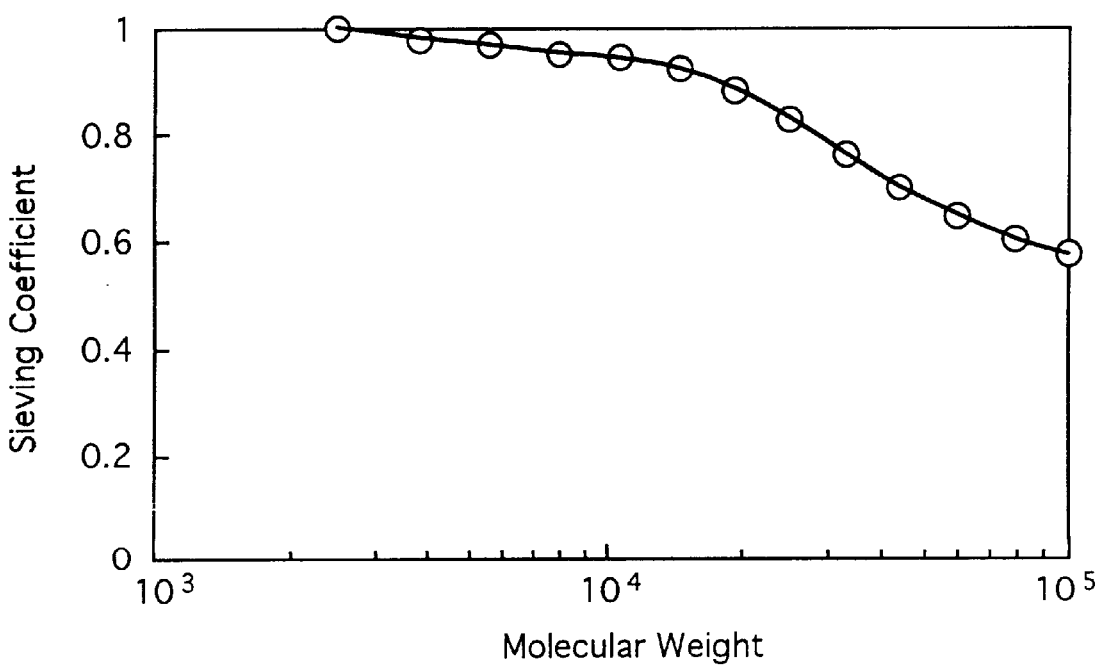
FIG. 3(b) is a graph showing measurements for the hollow fiber membrane prepared in Comparative Example 3.

FIG 3(b) shows measurements for the hollow fiber membrane prepared in Comparative Example 3.

The hollow fiber membrane production process of the present invention is an improvement of conventional processes including those described in U.S. Pat. No. 3,615,024; Journal of Applied Polymer Science, vol. 20, 2377–2394 (1976); and Journal of Applied Polymer Science, vol. 21, 165–180 (1977). A typical system used in the production of the hollow fiber membrane is shown in FIG. 1 wherein the hollow fiber membrane is produced in a spinning system 1 comprising a spinning solution container 2, a core solution container 3, a spinning orifice 4, a coagulation bath 5, a washing bath 6, and a take up roll 7. The orifice 4 is of tube-in-tube structure, and comprises an inner tube and an outer tube. An annular orifice is defined between the inner and outer tubes.

A spinning solution comprising a solution of polymer in a solvent is filled in the spinning solution container 2.

The spinning solution from the spinning solution container 2 is extruded into air from the annular orifice defined between the outer tube and the inner tube of the spinning orifice 4 of the tube-in-tube type, and the core solution from the core solution container 3 is ejected from the inner tube into center bore of the extruded spinning solution. The extrudate is allowed to fall down by gravity for stretching, and then drawn into the coagulation bath 5 for coagulation. In the present invention, the core solution contains a hydrophobic modifier in combination with a surfactant, and the resulting hollow fiber membrane contains the hydrophobic modifier on its inner surface. Typical coagulation solution filled in the coagulation bath 5 is a nonsolvent of the polymer constituting the spinning solution. The coagulation solution, however, may contain a small amount of a solvent of the polymer, a surfactant, or the like. The filament 8 which is the hollow fiber membrane is then taken out of the coagulation bath 5, passed through the washing bath 6, and wound by the take up roll 7. A typical solution used in the washing bath 6 is water.

In the step of such washing with water, the medium and the surfactant in the core solution are washed away from the hollow fiber membrane to leave the hydrophobic modifier such as the vitamin E insolubilized and immobilized on and in the matrix of the inner surface of the hollow fiber membrane. The surfactant such as the water soluble, high molecular weight compound which failed to be removed from the hollow fiber membrane in the washing step can be selectively removed afterwards or after the assemblage of the dialyzer with the immobilized hydrophobic modifier such as vitamin E remaining in and on the membrane.

The thus produced hollow fiber membrane of the present invention has an inner diameter in the range of 10 to 1000 $\mu$m, and preferably 100 to 300 $\mu$m, and a membrane thickness in the range of 5 to 100 $\mu$m, and preferably 20 to 60 $\mu$m. The hydrophobic modifier is present not only on the inner surface of the hollow fiber membrane, but also on the surface of the micropores near the inner surface.

In view of maximizing the advantages of the present invention, the hollow fiber membrane should contain 1 to 1000 mg/M$^2$ of the fat-soluble vitamin, and more preferably, 10 to 100 mg/M$^2$ of the fat-soluble vitamin impregnated within the membrane, and the hollow fiber membrane will then exhibit platelet coagulation inhibitory action for a prolonged period of time.

As will be demonstrated in the Examples and Comparative Examples, the hollow fiber membrane of the present invention is the one prepared by spinning a spinning solution containing a polymer having a solubility parameter $\delta$ of up to 13 (cal/cm$^3$)$^{1/2}$, and the thus produced hollow fiber membrane has sieving coefficients measured with dextrans of up to 0.4, and preferably up to 0.2 at a molecular weight of 100,000, and at least 0.5, and preferably at least 0.7 at a molecular weight of 10,000.

Such hollow fiber membrane is typically produced by the hollow fiber membrane production process as described above. It should be noted, however, that hollow fiber membranes other than those produced by the above-described process are within the scope of the hollow fiber membrane of the present invention.

Next, the dialyzer of hollow fiber membrane type according to the present invention is described by referring to FIG. 2. The dialyzer 10 of the hollow fiber membrane type comprises a tubular main barrel 13 having an inlet 11 and an outlet 12 for the dialyzer solution; a bundle 14 of hollow fiber membranes of the present invention inserted in the tubular main barrel 13 and fixedly secured on its opposite ends to the tubular main barrel 13 by potting members 15 and 16 comprising a potting resin. Such structure may resemble a shell-and-tube structure found, for example, in a heat exchanger. Headers 19 and 20 respectively provided with an inlet port 17 and an outlet port for the body fluid 18 are abutted against the opposite ends of the tubular main barrel 13. Caps 21 and 22 are respectively screwed onto opposite ends of the tubular main barrel 13 to fixedly secure the headers 19 and 20 onto the tubular main barrel 13. Tubes 23 and 24 are respectively connected to the inlet port 17 and the outlet port 18, and the tubes 23 and 24 are connected to human body. The tubular main barrel 13, the headers 19 and 20, and the caps 21 and 22 may be prepared from such materials as polycarbonate and polypropylene, and the potting resin may typically comprise polyurethane.

Next, the present invention is described in further detail by referring to the Examples of the present invention and Comparative Examples, which by no means limit the scope of the invention.

EXAMPLES

Example 1

A core solution for spinning was prepared by adding 0.1% by weight of α-tocopherol acetate and 0.1% by weight of Pluronick F-68 (polyethylene glycol-polypropylene glycol copolymer, manufactured by Asahi Denka Kogyo K.K.) to a core solution preparation comprising 70% by weight of DMF and 30% by weight of water. After allowing the core solution to stand at room temperature for 24 hours, a sample was collected from intermediate portion of the core solution, and diluted 5 times with ethanol. The thus diluted sample was evaluated for UV absorption at 284 nm to find the concentration of the dissolved α-tocopherol acetate.

Example 2

A core solution for spinning was prepared by adding 0.1% by weight of α-tocopherol acetate and 0.08% by weight of Pluronick F-68 (polyethylene glycol-polypropylene glycol copolymer, manufactured by Asahi Denka Kogyo K.K.) to a core solution preparation comprising 70% by weight of DMF and 30% by weight of water. After allowing the core solution to stand at room temperature for 24 hours, a sample was collected from intermediate portion of the core solution, and diluted 5 times with ethanol. The thus diluted sample was evaluated for UV absorption at 284 nm to find the concentration of the dissolved α-tocopherol acetate.

Example 3

A core solution for spinning was prepared by adding 0.1% by weight of a-tocopherol acetate and 0.06% by weight of Pluronick F-68 (polyethylene glycol-polypropylene glycol copolymer, manufactured by Asahi Denka Kogyo K.K.) to a core solution preparation comprising 70% by weight of DMF and 30% by weight of water. After allowing the core solution to stand at room temperature for 24 hours, a sample was collected from intermediate portion of the core solution, and diluted 5 times with ethanol. The thus diluted sample was evaluated for UV absorption at 284 nm to find the concentration of the dissolved α-tocopherol acetate.

Example 4

A core solution for spinning was prepared by adding 0.1% by weight of a-tocopherol acetate and 0.05% by weight of Pluronick F-68 (polyethylene glycol-polypropylene glycol copolymer, manufactured by Asahi Denka Kogyo K.K.) to a core solution preparation comprising 70% by weight of DMF and 30% by weight of water. After allowing the core solution to stand at room temperature for 24 hours, a sample was collected from intermediate portion of the core solution, and diluted 5 times with ethanol. The thus diluted sample was evaluated for UV absorption at 284 nm to find the concentration of the dissolved α-tocopherol acetate.

Example 5

A core solution for spinning was prepared by adding 0.1% by weight of α-tocopherol acetate and 0.04% by weight of Pluronick F-68 (polyethylene glycol-polypropylene glycol copolymer, manufactured by Asahi Denka Kogyo K.K.) to a core solution preparation comprising 70% by weight of DMF and 30% by weight of water. After allowing the core solution to stand at room temperature for 24 hours, a sample was collected from intermediate portion of the core solution, and diluted 5 times with ethanol. The thus diluted sample was evaluated for UV absorption at 284 nm to find the concentration of the dissolved α-tocopherol acetate.

Example 6

A core solution for spinning was prepared by adding 0.1% by weight of α-tocopherol acetate and 0.02% by weight of Pluronick F-68 (polyethylene glycol-polypropylene glycol copolymer, manufactured by Asahi Denka Kogyo K.K.) to a core solution preparation comprising 70% by weight of DMF and 30% by weight of water. After allowing the core solution to stand at room temperature for 24 hours, a sample was collected from intermediate portion of the core solution, and diluted 5 times with ethanol. The thus diluted sample was evaluated for UV absorption at 284 nm to find the concentration of the dissolved α-tocopherol acetate.

Example 7

A core solution for spinning was prepared by adding 0.1% by weight of α-tocopherol acetate and 0.1% by weight of PVP to a core solution preparation comprising 70% by weight of DMF and 30% by weight of water. After allowing the core solution to stand at room temperature for 24 hours, a sample was collected from intermediate portion of the core solution, and diluted 5 times with ethanol. The thus diluted sample was evaluated for UV absorption at 284 nm to find the concentration of the dissolved α-tocopherol acetate.

Comparative Example 1

A solution comprising 70% by weight of DMF and 30% by weight of water was diluted 5 times with ethanol. To this solution was added 0.1% (calculated concentration based on the solution of 70% DMF and 30° C. $H_2O$) by weight of α-tocopherol acetate. This solution was used for 0.1% by weight standard solution of α-tocopherol acetate.

Comparative Example 2

A core solution for spinning was prepared by adding 0.1% by weight of α-tocopherol acetate to a core solution preparation comprising 70% by weight of DMF and 30% by weight of water. After allowing the core solution to stand at room temperature for 24 hours, a sample was collected from intermediate portion of the core solution, and diluted 5 times with ethanol. The thus diluted sample was evaluated for UV absorption at 284 nm to find the concentration of the dissolved α-tocopherol acetate.

The results of Examples 1 to 7 and Comparative Examples 1 and 2 are shown in Table 1.

TABLE 1

| | UV absorption (284 nm) by α-tocopherol acetate in the core solutions | |
|---|---|---|
| | UV absorption | Tocopherol concentration, % |
| Comparative Example 1 | 0.673 | 0.1 |
| Comparative Example 2 | 0.120 | 0.0178 |

TABLE 1-continued

UV absorption (284 nm) by α-tocopherol acetate in the core solutions

|  | UV absorption | Tocopherol concentration, % |
|---|---|---|
| Example 1 | 0.670 | 0.0996 |
| Example 2 | 0.665 | 0.0988 |
| Example 3 | 0.680 | 0.1010 |
| Example 4 | 0.671 | 0.0997 |
| Example 5 | 0.636 | 0.0945 |
| Example 6 | 0.529 | 0.0786 |
| Example 7 | 0.672 | 0.0999 |

As shown in Table 1, the sample containing no surfactant as shown in Comparative Example 2 exhibited markedly poor uniformity of the vitamin E concentration, and the vitamin E concentration in the intermediate layer was as low as 17.8% of the standard solution as exhibited by the low UV absorption value. In the case of Pluronick, uniform vitamin E concentration (at 0.1% by weight) is substantially maintained when 0.05% by weight or more of Pluronick is added to the solution, and uniformity of the vitamin E concentration decreased with the decrease in Pluronick content at the Pluronick content of 0.04% or less. Similar effects were found when Pluronick was replaced with another surfactant, PVP.

Next, production of the hollow fiber membranes using the surfactant as described above is described in Examples 8 to 10 along with a Comparative Example 3.

Example 8

1. Preparation of Spinning Solution and Core Solution

The spinning solution was prepared by mixing 15% by weight of polysulfone (solubility parameter δ, 9.90 (cal/cm$^3$)$^{1/2}$), 9% by weight of PVP, 45% by weight of DMSO, 30% by weight of DMA, and 1% by weight of water.

The core solution was prepared by adding 0.1% by weight of α-tocopherol acetate and 0.1% by weight of Pluronick F-68 (polyethylene glycol-polypropylene glycol copolymer, manufactured by Asahi Denka Kogyo K.K.) to a core solution preparation comprising 70% by weight of DMF and 30% by weight of water.

2. Preparation of Hollow Fiber Membrane

The spinning solution and the core solution prepared in step 1 were simultaneously ejected from the outer tube (annular spinning orifice) and the inner tube of the orifice of tube-in-tube structure to thereby extrude the spinning solution into the air, and the core solution into the center bore of the extruded spinning solution in the form of a hollow filament. The filament was then passed through a coagulation bath filled with water where the filament became coagulated. After the coagulation, the filament was washed and dried to produce the hollow fiber membrane.

The resulting hollow fiber membrane had an inner diameter of about 200 μm, an outer diameter of about 280 μm, and an α-tocopherol acetate content of about 55 mg/M$^2$.

Example 9

1. Preparation of Spinning Solution and Core Solution

The spinning solution was prepared by mixing 15% by weight of polysulfone (solubility parameter δ, 9.90 (cal/cm$^3$)$^{1/2}$) 9% by weight of PVP, 45% by weight of DMSO, 30% by weight of DMA, and 1% by weight of water.

The core solution was prepared by adding 0.1% by weight of α-tocopherol acetate and 0.1% by weight of PVP to a core solution preparation comprising 70% by weight of DMF and 30% by weight of water.

2. Preparation of Hollow Fiber Membrane

The spinning solution and the core solution prepared in step 1 were simultaneously ejected from the outer tube (annular spinning orifice) and the inner tube of the orifice of tube-in-tube structure to thereby extrude the spinning solution into the air, and the core solution into the center bore of the extruded spinning solution in the form of hollow filament. The filament was then passed through a coagulation bath filled with water where the filament became coagulated. After the coagulation, the filament was washed and dried to produce the hollow fiber membrane.

The resulting hollow fiber membrane had an inner diameter of about 200 μm, an outer diameter of about 280 μm, and an α-tocopherol acetate content of about 53 mg/M$^2$.

As described above, a hollow fiber membrane can be spun without reducing water content of the core solution by using the hollow fiber membrane production process of the present invention wherein a hydrophobic modifier and a surfactant is added to the core solution. In other words, a hydrophobic modifier can be added to the core solution without making any substantial change in the composition of the core solution, namely, to a core solution of conventional composition, and the resulting hollow fiber membrane has membrane structural properties comparable to those of the conventional membranes. It should also be noted that the hydrophobic modifier is evenly distributed in the core solution owing to the surfactant, and therefore, addition of the modifier does not adversely affect the spinning properties.

Example 10

1. Preparation of Spinning Solution and Core Solution

The spinning solution was prepared by mixing 15% by weight of polysulfone (solubility parameter δ, 9.90 (cal/cm$^3$)$^{1/2}$), 9% by weight of PVP, 45% by weight of DMSO, and 31% by weight of DMA.

The core solution was prepared by adding 0.1% by weight of α-tocopherol acetate and 0.1% by weight of Pluronick F-68 to a core solution preparation comprising 50% by weight of DMF and 50% by weight of water.

2. Preparation of Hollow Fiber Membrane

The spinning solution and the core solution prepared in step 1 were simultaneously ejected from the outer tube and the inner tube of the orifice of tube-in-tube structure to thereby extrude the spinning solution into the air, and the core solution into the center bore of the extruded spinning solution in the form of hollow filament. The filament was then passed through a coagulation bath filled with water where the filament became coagulated. After the coagulation, the filament was washed and dried to produce the hollow fiber membrane.

The resulting hollow fiber membrane had an inner diameter of about 205 μm, an outer diameter of about 298 μm, and an α-tocopherol acetate content of about 55 mg/M$^2$. The inner surface and the outer surface of the hollow fiber membrane were examined by secondary ion mass sepctroscopy. A large amount of tocopherol acetate fragment was detected on the inner surface while no substantial amount was detected on the outer surface.

Comparative Example 3

1. Preparation of Spinning Solution and Core Solution

The spinning solution was prepared by mixing 15% by weight of polysulfone, 9% by weight of PVP, 45% by weight of DMSO, and 31% by weight of DMA.

The core solution was prepared by adding 0.1% by weight of α-tocopherol acetate to a core solution preparation comprising 20% by weight of DMF, 10% by weight of water, and 70% by weight of methanol.

2. Preparation of Hollow Fiber Membrane

The spinning solution and the core solution prepared in step 1 were simultaneously ejected from the outer tube and the inner tube of the orifice of tube-in-tube structure to thereby extrude the spinning solution into the air, and the core solution into the center bore of the extruded spinning solution in the form of hollow filament. The filament was then passed through a coagulation bath filled with water where the filament became coagulated. After the coagulation, the filament was washed and dried to produce the hollow fiber membrane.

The resulting hollow fiber membrane had an inner diameter of about 200 μm, an outer diameter of about 280 μm, and an α-tocopherol acetate content of about 52 mg/M$^2$.

Measurement of Molecular Weight Fractionation

The hollow fiber membranes prepared in Example 10 and Comparative Example 3 were evaluated for their molecular weight fractionation. The results are shown in FIG. 3. FIG. 3(a) shows measurements for the hollow fiber membrane prepared in Example 10, and FIG. 3(b) shows measurements for the hollow fiber membrane prepared in Comparative Example 3. The hollow fiber membrane of Comparative Example 3 prepared without surfactant showed the sieving coefficient (SC) at molecular weight of 100,000 was excessively high. Use of such hollow fiber membrane for the dialysis would invite excessive leakage of useful blood components such as albumin through the membrane.

The molecular weight fractionation was measured by using aqueous solutions of dextrans.

(a) Test Solution

Dextran T10 and T40 (Pharmacia) were respectively dissolved in physiological saline (Terumo) to 10 g/liter for use in the measurement.

(b) Measurement of Sieving Coefficient (SC)

Test solution was passed through a mini-module having a membrane area of 100 cm$^2$ at a linear speed of 100 cm/min at a constant pressure. The dextran solution was sampled at the inlet end (IN) and the outlet end (OUT) and from the filtrate (F). The sample (100 μl) was subjected to gel permeation chromatography (GPC) to find out the retention volume in relation to the molecular weight. On the basis of such relationship, sieving coefficient, SC was calculated from the dextran concentrations at IN, OUT, and F by the following equation:

$$SC = 2C_F/(C_{IN} + C_{OUT})$$

wherein C stands for the concentration, and the suffix respectively designate the sampling site.

The relationship of SC to the molecular weight (molecular weight fractionation course) was shown.

Measurement by GPC

Measurement system: High performance GPC system (Shodex GPC SYSTEM-11, manufactured by Showa Denko K.K.)

Column: Shodex universal GFC column, high-performance OHpak (OHpac KB-803)×2+precolumn (OHpak KB-800p) (both manufactured by Showa Denko K.K.)

Mobile phase: physiological saline (Terumo)

Flow rate: 1 ml/min

Temperature: 35° C.

Detection method: RI (differential refractometer)

Detection sensitivity: 128 mV

Data processing: Chromatograph Data Processor (Labchart 180, manufactured by Showa Denko K.K.)

In the measurement by GPC, the solutions were diluted to 20 times before the measurement.

EFFECTS OF THE INVENTION

The present invention is an improvement over the hollow fiber membrane production process wherein a polymer-containing spinning solution is extruded linearly from a tube-in-tube type orifice of a spinner in a coagulation solution to form the hollow fiber membrane. In the present process, the polymer-containing spinning solution is extruded from the outer tube, namely the annular space of defined between the inner and outer tube of the tube-in-tube type orifice to form a cylindrical filament having an inner bore, and a core solution containing a hydrophobic modifier and a surfactant is ejected from the inner tube of the orifice into the inner bore of the filament. The filament is coagulated by a coagulation solution to form the hollow fiber membrane. The spinning solution may be either extruded into air and then drawn into the coagulation solution, or directly extruded into the coagulation solution. The production process of the present invention is simple and economic, and the hollow fiber membrane produced is highly biocompatible.

In the present invention, content of the hydrophobic modifier in the core solution is in the range of 0.001 to 10% by weight, and therefore, the hydrophobic modifier is efficiently consumed with no waste.

When a fat-soluble vitamin is used for the hydrophobic modifier, the resulting hollow fiber membrane has a high biocompatibility.

When the fat-soluble vitamin used is a vitamin E, production of the hollow fiber membrane is quite convenient owing to the high thermal stability of the vitamin E.

The merits as described above is reliably attained by the use of α-tocopherol, α-tocopherol acetate, and α-tocopherol nicotinate for the vitamin E.

The washing of the once coagulated hollow fiber membrane may be conveniently effected since the surfactant added is a water-soluble high molecular weight compound.

When the content in the core solution of the water-soluble high molecular weight compound is in the range of 0.0001 to 20% by weight, vitamin E will be uniformly distributed in the core solution, and washing of the coagulated hollow fiber membrane would be easy.

The merits of the present invention as described above is reliably attained when the spinning solution contains a polymer having a solubility parameter δ of up to 13 (cal/cm$^3$)$^{1/2}$.

The present invention also provides a porous hollow fiber membrane produced by the production process as described above, and the hollow fiber membrane of the invention is highly biocompatible and exhibits good sieving properties for various substances that are contained in the body fluid. The hollow fiber membrane is also a membrane produced at low cost by a simple procedure.

The present invention also provides a dialyzer utilizing the porous hollow fiber membrane produced by the production process as described above, and the dialyzer of the invention fully enjoys various merits of the hollow fiber membrane of the invention including the excellent sieving performance for various biological substances, high biocompatibility, simple production process, and low production cost.

We claim:

1. A process for producing a hollow fiber membrane by extruding a polymer-containing spinning solution from a tube-in-tube type orifice of a spinner into a coagulation solution to form the hollow fiber membrane, comprising the step of extruding the polymer-containing spinning solution from the outer tube of the orifice to form a cylindrical filament having an inner bore while ejecting a coagulative core solution from the inner tube of the orifice into the inner bore of the filament;

wherein the filament is directly extruded into the coagulation solution or extruded into air and then drawn to the coagulation solution, and wherein said coagulative core solution contains more than 20% of water, and said coagulative core solution is supplemented with at least one hydrophobic modifier selected from the group consisting of a fat-soluble vitamin, a fatty acid and a fish oil; and a surfactant and the resulting hollow fiber membrane contains the hydrophobic modifier on its inner surface.

2. The hollow fiber membrane production process according to claim 1 wherein said hydrophobic modifier comprises 0.001 to 10% by weight of said core solution.

3. The hollow fiber membrane production process according to claim 1 wherein said hydrophobic modifier is a fat-soluble vitamin.

4. The hollow fiber membrane production process according to claim 3 wherein said fat-soluble vitamin is a vitamin E.

5. The hollow fiber membrane production process according to claim 4 wherein said vitamin E is at least one member selected from the group consisting of α-tocopherol, α-tocopherol acetate, and α-tocopherol nicotinate.

6. The hollow fiber membrane production process according to claim 1 wherein said surfactant is a water-soluble, high molecular weight compound.

7. The hollow fiber membrane production process according to claim 6 wherein said water-soluble, high molecular weight compound comprises 0.0001 to 20% by weight of said core solution.

8. The hollow fiber membrane production process according to claim 1 wherein said polymer in the spinning solution has a solubility parameter $\delta$ of up to 13 $(cal/cm^3)^{1/2}$.

9. The hollow fiber membrane production process according to claim 1 wherein said coagulative core solution comprises 25% to 55% of water, and a polar organic solvent is selected from the group consisting of dimethylacetoamide, dimethylsulfoxide and dimethylformamide.

* * * * *